(12) United States Patent
Samson et al.

(10) Patent No.: US 7,711,393 B1
(45) Date of Patent: May 4, 2010

(54) CELLULAR COMMUNICATIONS NETWORK OPTICAL CROSS-CONNECT SWITCHING ARCHITECTURE

(75) Inventors: Louis John Samson, Clawson, MI (US); Sunil Dwarka Prasad, Novi, MI (US); Thomas Lawrence Bugg, Jr., Macomb, MI (US)

(73) Assignee: Nextel Communications Inc., Reston, VA (US)

( * ) Notice: Subject to any disclaimer, the term of this patent is extended or adjusted under 35 U.S.C. 154(b) by 691 days.

(21) Appl. No.: 11/528,288

(22) Filed: Sep. 27, 2006

(51) Int. Cl.
*H04B 1/38* (2006.01)
(52) U.S. Cl. ............... 455/560; 455/422.1; 455/423; 370/221; 370/222
(58) Field of Classification Search ......... 370/216–218, 370/250, 242, 228, 392, 211, 222; 455/560, 455/423, 422.1
See application file for complete search history.

(56) References Cited

U.S. PATENT DOCUMENTS

| | | | |
|---|---|---|---|
| 6,282,423 B1 * | 8/2001 | Scott, II | 455/439 |
| 6,907,237 B1 * | 6/2005 | Dorenbosch et al. | 455/404.1 |
| 7,443,805 B1 * | 10/2008 | Bynum | 370/254 |
| 2008/0025208 A1 * | 1/2008 | Chan | 370/217 |

OTHER PUBLICATIONS

Ken Giesken, Node B Hotels/Distributed Antenna Systems, Bechtel Telecommunications, 2003 World Wireless Congress, May 28, 2003, 7 pages, San Francisco.
Sam Kettani, Node B Hotels for PCS Operators, Bechtel Telecommunications Technical Journal, Dec. 2002, vol. 1, No. 1, pp. 48-53.
Pending Patent Application, titled "Cellular Communications Network Architecture", Inventor Louis John Samson, et al., filed Sep. 27, 2006.
Pending Patent Application, U.S. Appl. No. 11/599,692, titled "Fiber Optic Ring Network For Cellular Communications System", Inventor Louis John Samson, et al., filed Nov. 15, 2006.

* cited by examiner

*Primary Examiner*—Nick Corsaro
*Assistant Examiner*—Chuong A Ngo

(57) ABSTRACT

A cellular communications network architecture is disclosed. The architecture includes a mobile switching office, a first base transceiver station in communication with the mobile switching office via a first communications link, and a second base transceiver station in communication with the mobile switching office via a second communications link. A first optical switch is in communication with the first base transceiver station via a third communications link and a second optical switch is in communication with the second base transceiver station via a fourth communications link. A fiber optic communications link couples the first optical switch with the second optical switch. The first optical switch is physically located separate from the first base transceiver station and the second optical switch is physically located separate from the second base transceiver station.

9 Claims, 6 Drawing Sheets

US 7,711,393 B1

CELLULAR COMMUNICATIONS NETWORK OPTICAL CROSS-CONNECT SWITCHING ARCHITECTURE

FIELD OF THE INVENTION

The present invention relates generally to the field of telecommunications, and in particular, to a cellular communications network architecture.

BACKGROUND OF THE INVENTION

Fiber optic technology is increasingly being utilized in cellular communications networks for a variety of purposes. Optical fiber generally has increased transmission capacity over copper wire and is generally more resistant to the effects of electromagnetic interference. Whereas this technology is being incorporated into cellular networks, the present state of incorporation does not take full advantage of the benefits that may be achieved with this technology.

FIG. 1 illustrates a typical network architecture for a cellular communications network 100. As can be seen, the cellular network consists of base transceiver stations (BTS) 110 which are individually connected to a mobile switching office (MSO) 120. The MSO is generally connected to the Public Switched Telephone Network (PSTN) 130. As is well-known, individual mobile units (MU) 140, which could be the individual subscribers' cell phones, communicate with the BTS when in the "cell" of the BTS.

Also shown in network 100 of FIG. 1 is a remote repeater node 150 that is connected to BTS 110. Repeater node 150 may be an optical repeater that is used in a distributed antenna system (DAS). As is known, a DAS node extends the coverage area of a cell. The DAS node is connected to a BTS and may be connected to the BTS by a fiber optic cable. Whereas only one DAS node is illustrated as being attached to one BTS, there may be many DAS nodes attached to a BTS.

Whereas known cellular networks may incorporate fiber optics technology, the architecture of the networks, and the current utilization of the technology in the networks, does not take full advantage of the capabilities of fiber optics technology. Therefore, there is a need to achieve greater utilization of fiber optics technology in cellular networks.

SUMMARY OF THE INVENTION

In accordance with an embodiment of a system of the present invention, a cellular communications network architecture is provided. The architecture includes a mobile switching office, a first base transceiver station in communication with the mobile switching office via a first communications link, and a second base transceiver station in communication with the mobile switching office via a second communications link. A first optical switch is in communication with the first base transceiver station via a third communications link and a second optical switch is in communication with the second base transceiver station via a fourth communications link. A fiber optic communications link couples the first optical switch with the second optical switch. The first optical switch is physically located separate from the first base transceiver station and the second optical switch is physically located separate from the second base transceiver station.

In accordance with a method of the present invention, a method for reconfiguring a cellular communications network is provided. The network architecture includes the first base transceiver station in communication with the mobile switching office via the first communications link, the second base transceiver station in communication with the mobile switching office via the second communications link, the first optical switch in communication with the first base transceiver station via the third communications link, the second optical switch in communication with the second base transceiver station via the fourth communications link, and the fiber optic communications link coupling the first optical switch with the second optical switch. The method includes the steps of detecting an inability for the first base transceiver station to communicate with the mobile switching office by the first optical switch. A communication is provided from the mobile switching office to the first optical switch via the second communications link between the mobile switching office and the second base transceiver station, via the fourth communications link between the second base transceiver station and the second optical switch, and via the fiber optic communications link coupling the second optical switch with the first optical switch.

DETAILED DESCRIPTION OF THE EXEMPLARY EMBODIMENTS

Figure 1:
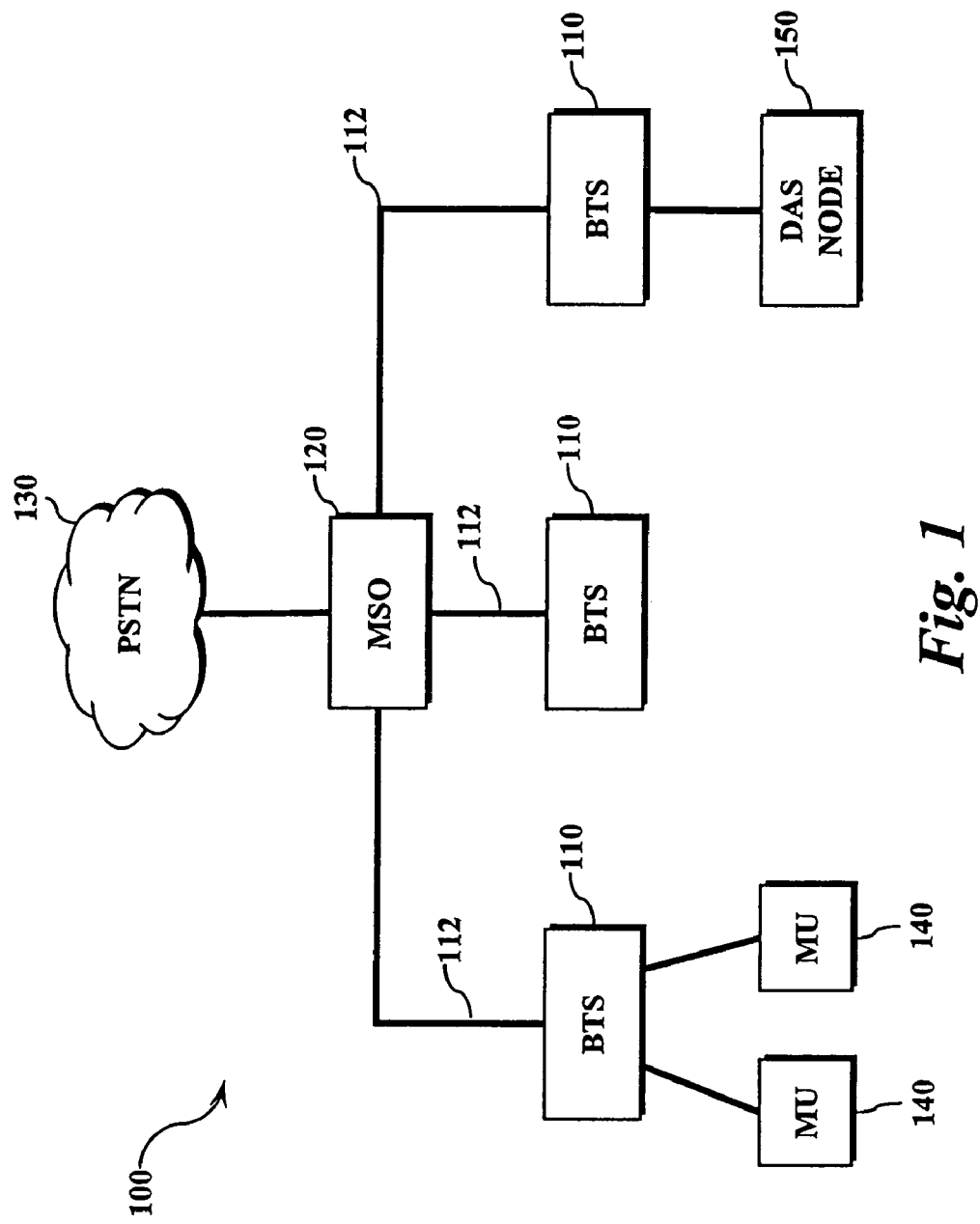
FIG. 1 illustrates a known cellular communications network architecture.

As discussed in the Background of the Invention section of this specification, FIG. 1 illustrates a typical network architecture for a cellular communications network 100. In this network, each BTS 110 is individually connected to the MSO 120 and the BTSs are not connected to each other. As can be seen, each BTS 110 is connected to MSO 120 by a communications link 112. This communications link may be either a copper cable or a fiber optic cable. However, regardless of how each BTS 110 is connected to the MSO 120, there is no direct connectivity between the BTSs. This can present drawbacks. For example, if the cable between a BTS and the MSO is severed, or if there is an interruption in the T1/DS3 service between the BTS and MSO for any reason, the BTS would not be able to provide cell service to the subscribers in that cell.

Figure 2:
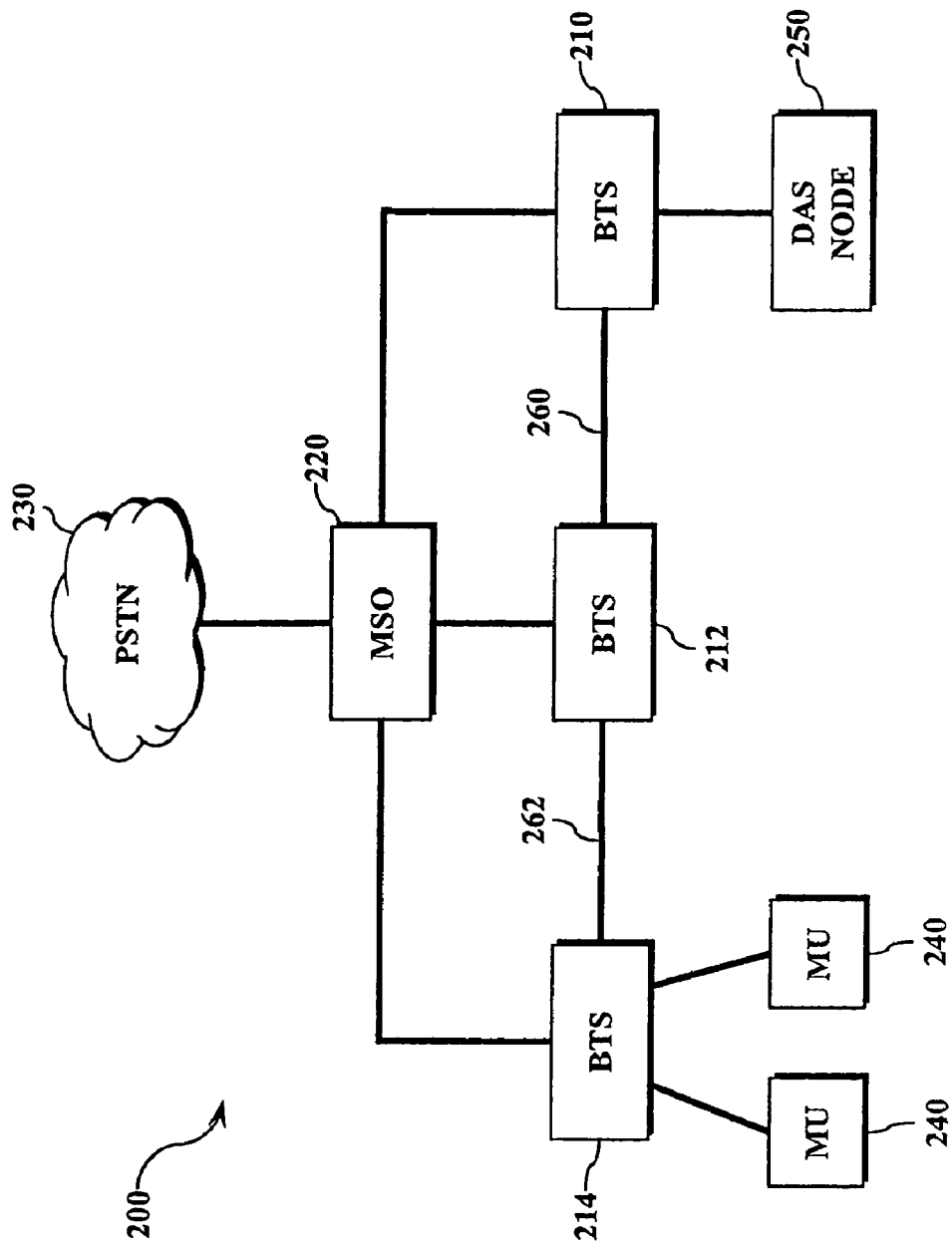
FIG. 2 illustrates a cellular communications network architecture in accordance with the principles of the present invention.

FIG. 2 illustrates a cellular network architecture in accordance with the principles of the present invention. As can be seen, cellular communications network 200 also includes an MSO 220 and BTS hubs 210-214 connected to the MSO. As described above, the MSO is connected to the PSTN 230 and individual mobile units MU) 240 communicate with the BTS when in the cell of the BTS. Whereas only two mobile units 240 are illustrated communicating with BTS 214, it is understood that multiple mobile units can communicate with each of the illustrated BTSs. Also illustrated is remote repeater node 250, which may be an optical repeater in a DAS. DAS node 250 is connected to BTS hub 210, for example, and multiple repeater nodes may be connected to each BTS hub used in network 200. In a cell that utilizes DAS nodes, the mobile units communicate with the BTS hub via a DAS node.

As can also be seen in network 200, each BTS hub is connected to the BTS hub(s) that is adjacent to it. Thus, BTS 210 is connected to adjacent BTS 212 and BTS 212 is connected to adjacent BTS 214. BTS 210 is connected to BTS 212 by link 260 and BTS 212 is connected to BTS 214 by link 262. The present invention is not limited to any particular embodiment for links 260 and 262. All that is required is that a connection be provided between adjacent BTSs so that any particular BTS can directly communicate with an adjacent BTS.

Figure 3:
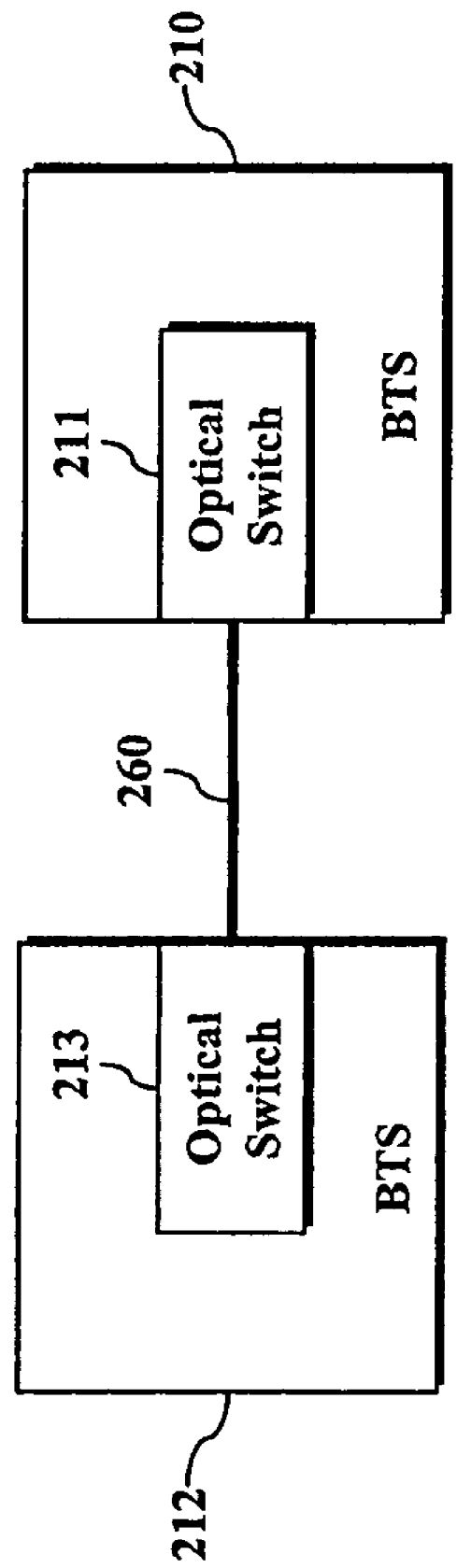
FIG. 3 illustrates coupled base transceiver stations in accordance with the principles of the present invention.

In an embodiment of the present invention, links 260 and 262 comprise a fiber optic cable. Additionally, as can be seen in FIG. 3, each BTS includes an optical switch. Thus, as shown, BTS 210 includes optical switch 211 and BTS 212 includes optical switch 213. As is known, the optical switches convert electrical signals in the BTS to optical signals. The optical switch of a transmitting BTS converts electrical signals to optical signals and transmits the optical signals to a receiving BTS. The optical switch of a receiving BTS converts the received optical signals from the transmitting BTS to electrical signals. Thus, the optical switch of a BTS transmits optical signals to, and receives optical signals from, an adjacent BTS, if required, over the connecting fiber optic links. In an alternative embodiment, each optical switch both receives and transmits optical signals. Thus, the switch is an all optical switch and there is no conversion of electrical signals to optical signals and vice versa.

The cellular network architecture 200 for the fiber optic repeater distributed antenna system of FIG. 2 has particular utility when one of the links that directly connects a BTS with the MSO is damaged. In this circumstance, as will be further explained below, the fiber optic link between the BTS with the damaged MSO connection and the adjacent BTS, and their associated optical switches, can provide for service to subscribers in the cell of the BTS with the damaged MSO connection when it otherwise would not have been available.

Figure 4:
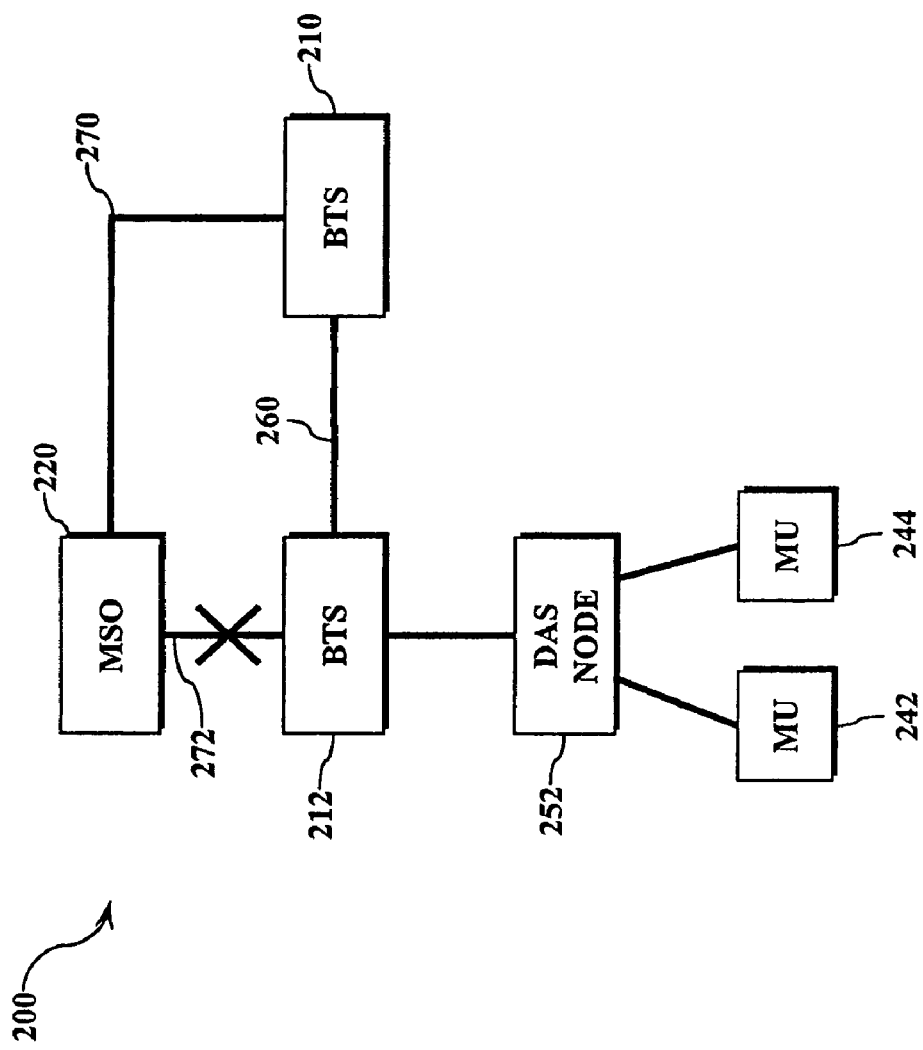
FIG. 4 illustrates the cellular communications network architecture of FIG. 2 where a link between a base transceiver station and the mobile switching office has been damaged such that an alternative communications path is provided to the base transceiver station.

As can be seen in FIG. 4, the link 272 between BTS 212 and MSO 220 has been damaged such that BTS 212 can no longer directly communicate with MSO 220. Whereas the damage in link 272 is illustrated as a physical disconnection in the link, it can be understood that the present invention has utility in any other situation where a BTS is not able to communicate with an MSO, such as where there is an interruption in the T1/DS3 service between the BTS and the MSO. In this circumstance where BTS 212 cannot communicate with MSO 220, in the absence of the present invention, BTS hub 212 could not provide service to DAS node 252 and other nodes associated with this hub. Thus, no cell service would be provided to mobile units 242 and 244, for example.

In accordance with the principles of the present invention, in this circumstance where BTS 212 cannot directly communicate with MSO 220, BTS 212 can alternatively communicate with MSO 220 via fiber optic cable 260, BTS 210 and link 270. As can be understood, in the event of a physical break or an outage in service between BTS 212 and MSO 220, the optical switch in BTS 212 detects the flaw and automatically re-routes transmissions back to MSO 220 over fiber link 260 and through BTS 210 and link 270. In turn, MSO 220 routes transmissions to BTS hub 212 via linked BTS hub 210, which backfeeds the transmissions to affected BTS hub 212 via the fiber link 260. This effectively prevents any loss of service to the remote DAS node(s) 252. This architecture takes advantage of the automated fault detection capabilities in optical switches and allows the linked BTS hub to backfeed transmissions to the BTS hub that ordinarily would have been without service. Thus, a redundant network architecture is provided.

The present invention is not limited to any particular embodiment for the fiber optic cables connecting the adjacent BTSs and the BTSs with the MSO. The cables may include any type of fiber, any number of fibers, and the fibers may be bundled in various numbers in separate buffer cables.

Figure 5:
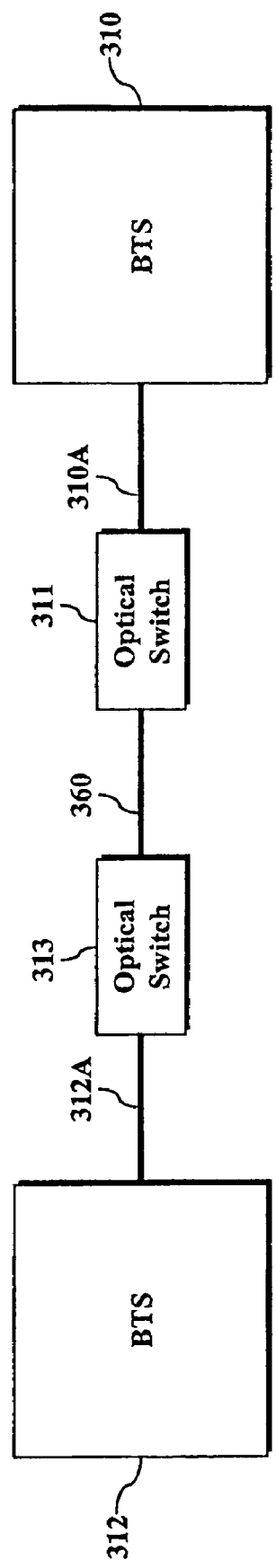
FIG. 5 illustrates an architecture for an optical switch and associated base transceiver station in accordance with the principles of the present invention.

Further in accordance with the principles of the present invention for the architecture of FIG. 2, as illustrated in FIG. 5, the optical switch associated with a respective BTS is not physically co-located with the BTS. Currently, in fiber optical repeater distributed antenna system networks, BTS hub sites are housed in hotel arrangements where the fiber optical switching equipment is co-located with the RF equipment. Thus, in the event that the BTS hub hotel suffers a catastrophic event, both RF and optical switching capabilities are lost.

As will be further discussed below, in accordance with the principles of the present invention, the architecture of the present invention provides particular utility in a circumstance where a BTS is not able to communicate with the MSO because, for example, the BTS hub is destroyed by a catastrophic event such as a fire. In this circumstance where the BTS hub is destroyed, as discussed above, if the optical switch is co-located with the BTS, the optical switch would also be destroyed, and thus, communications in the cell would be lost. With the architecture in accordance with the principles of the present invention, physically locating the optical switch separate from the BTS allows the optical switch to remain functioning and further takes advantage of the optical switch's capability for automated sensing and routing, as discussed previously. When the switch loses the transmission from the BTS hub, the optical switch senses the loss and transmissions from the optical switch are re-routed backward to the MSO, which in-turn re-transmits the transmission to the optical switch via its adjacent BTS hub and its associated optical switch. In this architecture, the remote DAS repeaters in communication with the affected optical switch do not lose the signal transmission, and thus, cellular service is not lost in this cell. Therefore, by linking the optical switches of adjacent BTS hubs and locating the optical switches of the BTS hubs physically separate from the hubs, fiber optical repeater networks can be further hardened with an additional layer of redundancy.

FIG. 5 illustrates an architecture for an optical switch and associated base transceiver station in accordance with the principles of the present invention. As can be seen, optical switch 311 is physically separate from its associated BTS 310 and optical switch 313 is physically separate from its associated BTS 312. In an embodiment, optical switch 311 is in communication with its BTS 310 via an electrical communications link 310A and optical switch 313 is in communication with its BTS 312 via an electrical communications link 312A. Fiber optic communications link 360 couples optical switch 311 to optical switch 313.

Thus, in the architecture of FIG. 5, each optical switch is in communication with its associated BTS and adjacent BTSs are in communication with each other via fiber optic link 360, which couples the optical switches. A difference between this architecture and the architecture illustrated in FIG. 3 is the physical separation of the optical switch from its associated BTS. The present invention is not limited to how this physical separation is embodied. For example, the BTS may be housed in a physical enclosure, e.g., terminal building, and the optical switch may be housed in a separate physical enclosure, e.g., a different terminal building. All that is required is that the optical switch be physically located separate from the BTS such that in the event that the BTS suffers a catastrophic physical failure, the optical switch is not affected.

Figure 6:
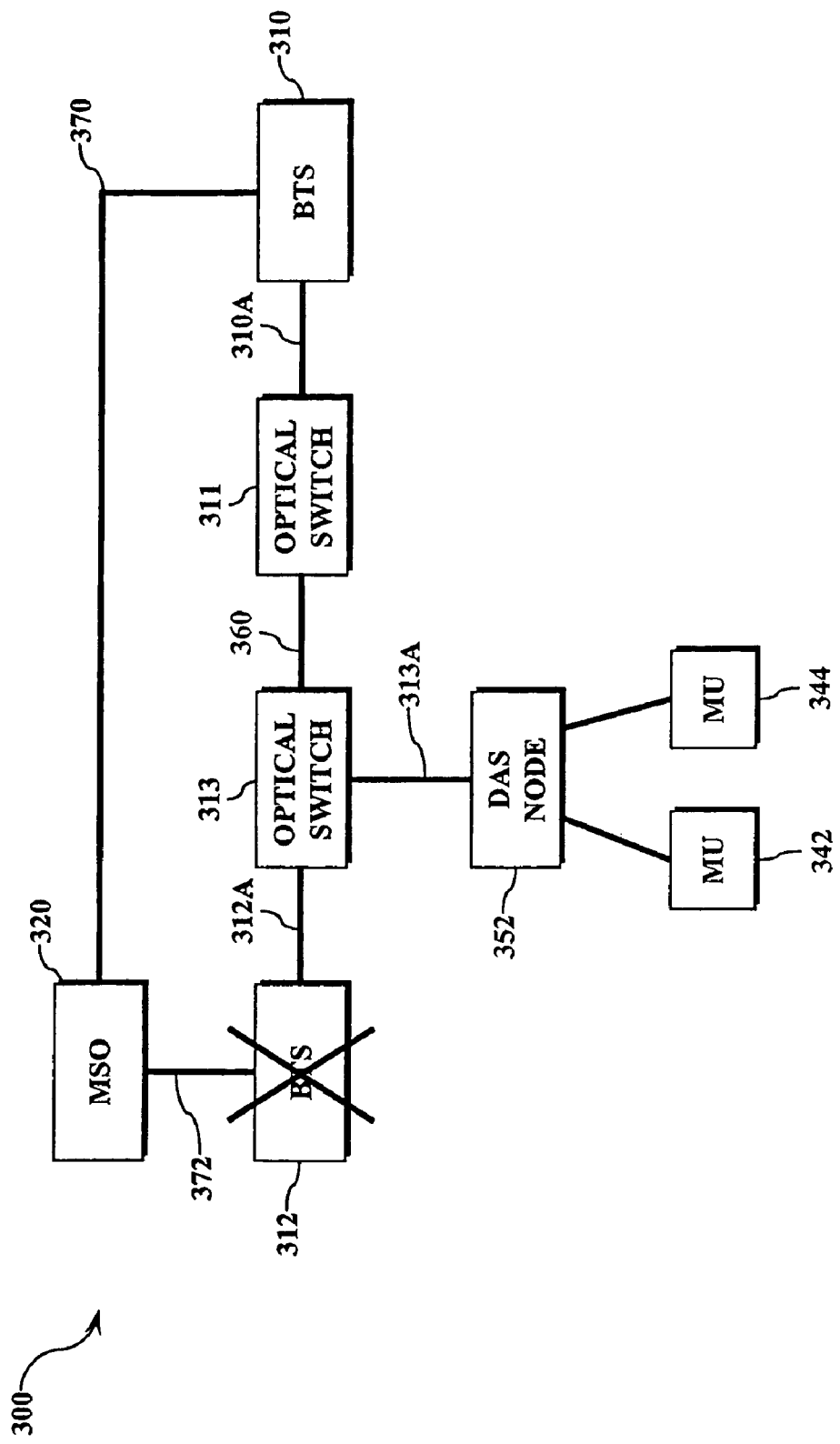
FIG. 6 illustrates a cellular communications network architecture where a base transceiver station is inoperable and an alternative communications path is provided to the optical switch associated with the inoperative base transceiver station.

The cellular network architecture 300 for the fiber optic repeater distributed antenna system, as shown in FIG. 6, illustrates the utility of the architecture where the optical switch is physically located separate from its associated BTS. As discussed above, this architecture has particular utility when a particular BTS physically, catastrophically fails. In this circumstance, as will be further explained below, the optical switch of this affected BTS can provide for service to subscribers in the cell of the damaged BTS when it otherwise would not have been available.

As can be seen in FIG. 6, BTS 312 has been rendered physically inoperative such that BTS 312 can no longer communicate with MSO 320. In this circumstance where BTS 312 has been physically damaged, in the absence of the present invention, optical switch 313 would also be physically damaged and cell service could not be provided to DAS node 352 and other nodes associated with this hub. As can be seen, DAS node 352 is in communication with optical switch 313. Thus, no cell service would be provided to mobile units 342 and 344, for example. Whereas only one DAS node is illustrated in communication with optical switch 313, it can be understood that many DAS nodes can be in communication with optical switch 313. Also, DAS nodes would also be in communication with optical switch 311 to provide cell service to mobile units in that cell.

In accordance with the principles of the present invention, in this circumstance where BTS 312 is catastrophically, physically damaged, since optical switch 313 is physically located separate from BTS 312, optical switch 313 is not damaged and can still communicate with DAS node 352. Since communications with MSO 320 through BTS 312 have been lost by optical switch 313, switch 313 can alternatively communicate with MSO 320 via a path that includes fiber optic cable 360, optical switch 311, link 310A, BTS 310 and link 370. As can be understood, in the event of a physical, catastrophic failure of BTS 312, the optical switch 313 associated with BTS 312 is not damaged due to its physical separation from BTS 312 and detects the outage of BTS 312. Switch 313 automatically re-routes transmissions back to MSO 320 over fiber link 360 and through optical switch 311, link 310A, BTS 310 and link 370. In turn, MSO 320 routes transmissions to optical switch 313 via linked BTS hub 310 and its associated optical switch 311, which backfeeds the transmissions to switch 313 via the fiber link 360. This effectively prevents any loss of service to the remote DAS node(s) 352 in the event of a catastrophic failure of BTS 312. This architecture takes further advantage of the automated fault detection capabilities in optical switches and allows the linked BTS hub to backfeed transmissions to the optical switch that ordinarily would have been without service. Thus, a redundant network architecture is provided.

As with the architecture of FIG. 2, the architecture of FIG. 6 is not limited to any particular embodiment for the fiber optic cables connecting the adjacent BTSs, through their respective optical switches, and the BTSs with the MSO. The cables may include any type of fiber, any number of fibers, and the fibers may be bundled in various numbers in separate buffer cables. Also, whereas in an embodiment the communications link between the BTS and its associated optical switch is an electrical communications link, e.g., a conventional T1 line, the present invention is not limited to an electrical link. In an alternative embodiment, similar to the embodiment discussed previously, each optical switch is an all optical switch and there is no conversion of electrical signals to optical signals and vice versa.

Further, whereas the architecture of FIG. 6 is illustrated with an outage of BTS 312, the principles of the present invention can be applied to provide redundancy in this architecture in the event of an outage of any particular BTS hub(s).

The disclosed embodiments are illustrative of the various ways in which the present invention may be practiced. Other embodiments can be implemented by those skilled in the art without departing from the spirit and scope of the present invention.

What is claimed is:

1. A method for reconfiguring a cellular communications network, wherein the network architecture includes a first base transceiver station in communication with a mobile switching office via a first communications link, a second base transceiver station in communication with the mobile switching office via a second communications link, a first optical switch in communication with the first base transceiver station via a third communications link, a second optical switch in communication with the second base transceiver station via a fourth communications link, and a fiber optic communications link coupling the first optical switch with the second optical switch, comprising the steps of:

detecting an inability for the first base transceiver station to communicate with the mobile switching office by the first optical switch; and providing a communication from the mobile switching office to the first optical switch via the second communications link between the mobile switching office and the second base transceiver station, via the fourth communications link between the second base transceiver station and the second optical switch, and via the fiber optic communications link coupling the second optical switch with the first optical switch.

2. The method of claim 1 wherein the inability for the first base transceiver station to communicate with the mobile switching office results from an operational failure of the first base transceiver station.

3. The method of claim 1 wherein the step of detecting an inability for the first base transceiver station to communicate with the mobile switching office includes the step of providing a transmission from the first optical switch to the mobile switching office via the fiber optic communications link, the fourth communications link, and the second communications link.

4. The method of claim 1 further comprising the step of communicating with a distributed antenna system node by the first optical switch.

5. The method of claim 1 further comprising the step of converting an electrical signal into an optical signal by the second optical switch.

6. The method of claim 1 wherein the fourth communications link is a T1 line.

7. The method of claim 1 wherein the first and second communications links include a fiber optic cable.

8. The method of claim 1 wherein a first distributed antenna system node is in communication with the first optical switch and a second distributed antenna system node is in communication with the second optical switch.

9. The method of claim 1 wherein the first optical switch is housed in a first enclosure and the first base transceiver station is housed in a second enclosure and wherein the second optical switch is housed in a third enclosure and the second base transceiver station is housed in a fourth enclosure.

* * * * *